2,838,424
TREATMENT OF WOOD

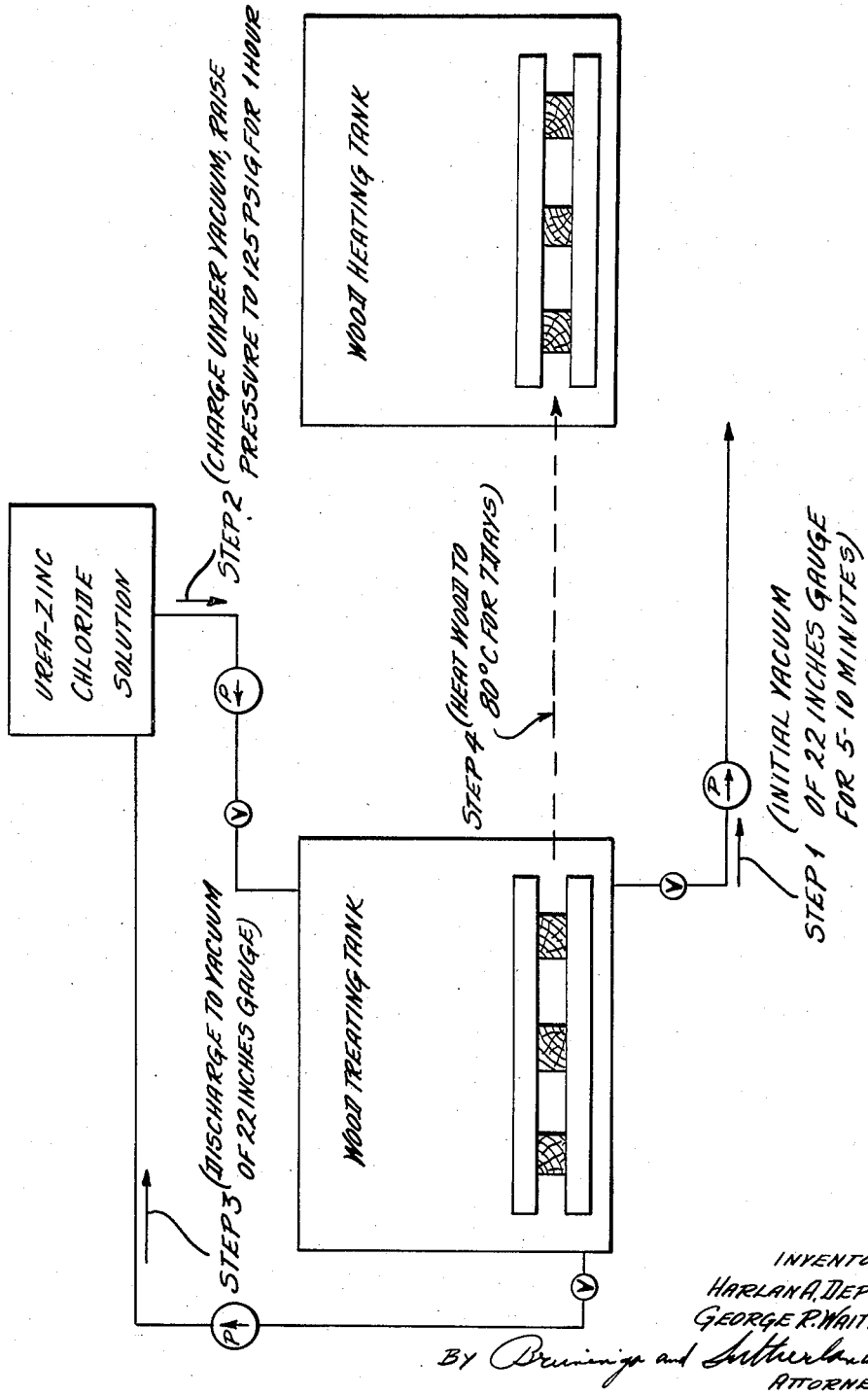

Harlan A. Depew, Glendale, and George R. Waitkins, Des Peres, Mo., assignors to American Zinc, Lead & Smelting Company, St. Louis, Mo., a corporation of Maine Application July 20, 1955, Serial No. 523,384

10 Claims. (Cl. 117—137)

This invention relates to wood preservation.

The need for permanently fire resistant wood is well recognized. The fire code of some cities requires fire resistant treatment of wood used for the interior of buildings, and methods of treatment have been devised which meet these requirements. However, the wood treating processes commonly used heretofore have not produced wood suitable for exterior use, and no commercially accepted method for producing such wood has been developed, in spite of the fact that there is a pressing need for a fire resistant wood for use in ships, railroad trestles, and buildings of all sorts.

One of the materials used heretofore, which renders wood fire resistant and in addition toxic to fungi and termites and yet is non-toxic to warm-blooded animals, is zinc chloride. Zinc chloride has, however, several important undesirable properties. It is readily leached from wood by water. To render wood fire resistant by its use, around four pounds per cubic foot of zinc chloride are required, and when this amount is put into wood, it makes the wood hygroscopic. In humid atmospheres, the water pick up is large. Under these conditions, the zinc chloride dissociates, producing hydrochloric acid that damages the wood severely, so that after a few years the wood has little strength.

Chromates have been added to the zinc chloride in order to make the zinc chloride less corrosive to the treating equipment, and it has been claimed that the addition of the chromates increased the insolubility of the zinc, but the evidence does not substantiate the claim.

Since chromium will catalyze combustion, some boric acid and ammonium sulfate are added to the chromated zinc chloride in what is known commercially as the CZC–FR (fire resistant) grade, but commercial experience has not justified this composition for wood for exterior service.

A more positive approach to this problem was presented by Ferguson, U. S. Patent No. 1,261,736, Arent, U. S. Patent No. 1,318,524, and Munroe, U. S. Patent No. 1,338,322. They dissolved zinc chloride or a mixture of zinc chloride and zinc phosphate in ammonium hydroxide and impregnated the wood with this composition. Then when the ammonia was evaporated they reported the presence of zinc hydroxide and basic compounds that were somewhat insoluble.

We have investigated the methods of Ferguson, Arent and Munroe. In our tests of those methods, zinc chloride was dissolved in aqua ammonia to form a solution containing 14% Zn and 15.7% Cl. Wood was impregnated with the solution and then dried. Fire tube tests on the leached wood showed that around 8 lbs. of zinc, calculated as ZnO, per cubic foot of wood were required to give fire tube results below 30%. The following table indicates the results obtained.

| Retention Lbs. ZnO/Cu. Ft. Wood | Days Leaching in Running Water | Percent Fire Tube Loss | |
|---|---|---|---|
| | | 3 Min. Values | ASTM Final |
| 8.1 | 15 | 17 | 21 |
| 8.1 | 30 | 23 | 29 |

The performance is generally satisfactory but the amounts of zinc required are too great to be economically feasible.

The amount of water soluble ammonium chloride produced is also undesirable. The amount of ammonium chloride is preferably kept at a minimum. In large amounts it can interfere with the paintability of the treated wood, cause warping of the wood, and dissolve zinc compounds during leaching.

In these tests and the tests set out hereafter in connection with the illustrative examples of the process of our invention, the fire tube losses are determined in accordance with ASTM E-69-50-ASTM Standards 1952, part 4, p. 1014. Briefly, in these fire tube tests, a test stick of wood of standard dimensions is suspended vertically within a metal tube or flue, from the beam of a balance which is calibrated in terms of percent of weight of the test stick, rather than in absolute units. That is, the scale of the balance runs from 0% when a standard stick is initially put in place, to 100% when no stick is present. A flame of standard size and intensity is applied to the lower end of the suspended stick. As the stick is consumed by the flame, the percentage loss of weight is indicated directly by a pointer on the balance. This percentage loss is recorded at half minute intervals for four minutes when the applied flame is withdrawn and then continued until the loss of weight for a one minute period does not exceed 1%. Untreated wood will burn to 75–85% loss in less than three minutes. The marginal loss is approximately 40% after four minutes. If more than 40% loss is sustained, the entire stick will be charred. If less than 40% loss is sustained, the flame becomes self-extinguishing and a portion of the stick remains uncharred. A 30% fire tube loss indicates good fire resistance, and 20% is excellent. Except in very exceptional cases, no stick will sustain less than 12% loss. The fire tube loss recorded at the end of three minutes is significant as an indication of the rate of flame spread.

The Pershall Patent No. 2,637,691 represents an advance in the wood treating art over Ferguson, Arent and Munroe. The Pershall process involves preparing basic zinc chloride, dissolving it in aqueous ammonia, and treating wood with the solution. Nevertheless, the Pershall process has several shortcomings. The zinc concentration of the saturated solution is only about 10%, so that it is difficult with many woods to put enough zinc in the wood with one impregnation to give the desired fire resistance. The solution is unstable. On standing, the zinc oxide polymer produced when the basic zinc chloride is dissolved in ammonia breaks down and deposits zinc hydroxide crystals on the walls of the treating container. The deposit in the wood is not uniform. On evaporation of the ammonia, the first precipitate is zinc oxide or zinc hydroxide because of the highly basic nature of the solution. Then very basic zinc chlorides are precipitated, followed by less basic zinc chlorides; then zinc diamino chloride ($ZnCl_2 \cdot 2NH_3$), and finally, soluble $NH_4Cl$. The high pH of the alkaline solution may damage the wood. The adsorbed ammonia tends to increase the chlorine solubility.

A two-step treating process developed by Depew and Quinn involves the impregnation of wood with a water-soluble zinc salt, and a subsequent impregnation of the wood with a basic material which may be in the form of a base such as ammonia, sodium hydroxide, and the like, or in the form of alkylene oxides which are acid acceptors. In this two-step process, a basic zinc salt is formed in place within the pores of the wood. This two-step process offers several advantages over the Pershall process. The zinc concentration may be made as high as desired and the impregnating solutions are relatively stable as compared with the ammoniacal basic zinc chloride solution of the Pershall process. Particularly, when the wood is treated with an acid acceptor such as ethylene oxide, the wood is not subjected to the high pH which may be produced in the Pershall process. The two-step process does not lay down a thoroughly uniform deposit, particularly when the wood is first treated, and involves two treating steps each of which involves a separate procedure.

One of the objects of this invention is to provide an economical process for impregnating wood with a basic zinc salt in such a manner that the impregnant in the wood is stable and water-insoluble, and uniformly distributed.

Another object is to provide such a process in which the wood is impregnated with a single impregnant solution and in which the basic zinc salt is formed and deposited from the solution within the pores of the wood.

Another object is to provide such a process wherein the basic zinc salt is deposited with a pH of around 6, in such a way that extremes of acidity and alkalinity are avoided.

Another object is to provide treated wood which is fire resistant, toxic to fungi and to termites, and repellant to marine borers; which is non-hygroscopic and nearly neutral; which is readily worked with high speed tools, is clean-surfaced and paintable.

Other objects will become apparent to those skilled in the art in the light of the following description.

The drawing is a flow diagram of one illustrative embodiment of process of this invention.

In accordance with this invention generally stated, wood is impregnated with a solution of a zinc salt and a potentially basic material, reaction between the zinc salt and the potentially basic material in the solution being restrained during the impregnation, the potentially basic material is subsequently converted to a basic material within the pores of the wood, and a basic zinc salt it precipitated from the solution in situ in the wood. The resulting deposit is uniformly distributed and is characterized by high density and hardness, tenacious adherence, and a pH of around 6.

The term "potentially basic material" is used herein to indicate materials which do not, in the condition of the impregnating solution before impregnation of the wood, react with water-soluble zinc salts, but which are capable of being converted, within the pores of wood impregnated with them, to basic materials which are capable of reacting to form water-insoluble basic zinc salts. The term "basic material" is used herein to include alkylene oxides which are acid acceptors, as well as bases such as ammonia, sodium hydroxide, barium hydroxide, sodium carbonate and the like, and zinc hydroxide itself.

Examples of potentially basic materials which may be used in the process of this invention are urea, formamide, potassium cyanate, zinc nitrite, zinc trichloroacetate, sodium sulfite or thiosulfate plus formaldehyde, and ethylene oxide or similar epoxides in anhydrous isopropyl alcohol. Numerous other suitable materials will occur to those skilled in the art in the light of the following disclosure.

In carrying out the process of this invention, wood may be impregnated by pressure or by soaking at atmospheric pressure.

One pressure procedure will be referred to hereafter as the empty cell procedure. In this procedure the wood is placed in a pressure vessel, commonly a horizontal cylinder, and moderate air pressure is applied. An impregnant solution is then forced into the cylinder and into the wood. Pressure of up to 100-150 pounds per square inch gauge is applied, forcing the impregnant solution deep into the wood. The pressure is then released and the unabsorbed solution is removed from the cylinder. A vacuum is then applied and the residual air in the capillaries of the wood expands, thereby forcing the excess liquid in the pores from the wood. The wood pores are thus covered with a thin film of impregnant.

Another pressure procedure will be referred to hereafter as the full cell procedure. In this procedure, a high vacuum is applied initially to the pressure vessel containing the wood. An impregnating solution is added to the cylinder and surrounds the wood while the vacuum is maintained. Positive pressure is then applied to force the impregnant into the wood. At the end of the impregnation, the pressure is released. A final vacuum is applied, and the unabsorbed solution is removed from the cylinder. Since the residual air in the pores of the wood is to a large extent removed by the initial vacuum, a considerable amount of liquid remains in the pores. However, of the relatively small amount of residual air which is not removed from the pores of the wood by the initial vacuum, some dissolves in the solution during the pressure period. When the pressure is released, this dissolved air comes out of solution in the form of bubbles, causing the wood to bleed. The application of the final vacuum prevents or minimizes bleeding by rapidly removing the solution that would normally run out anyway by virtue of the expansion of the dissolved air.

Various modifications of the empty cell and full cell procedures may be used. For example, the impregnating solution may initially be admitted to the treating cylinder under atmospheric pressure in either procedure, or under a low vacuum.

In the soaking procedure, the wood can be fastened down in an open tank containing the solution. Over a period of time, the air in the pores of the wood is displaced by the liquid. The unabsorbed solution is then drawn off.

The following general examples are illustrative of the reactions which may be utilized to carry out the process of this invention. The theory of their operation forms no part of this invention. Some of the equations given are over-simplified, but they are useful to indicate the end result obtained and a possible explanation of the way in which it is obtained.

When urea is the potentially basic material, wood may be impregnated with a solution of zinc chloride and urea at room temperature. Then the impregnated wood is heated to a temperature at which the urea is hydrolyzed, either with the water in the impregnating solution, if an aqueous solution is used, or with moisture in the wood if the impregnating solution is not aqueous. A reaction then takes place within the pores of the wood which may be represented by the following equations:

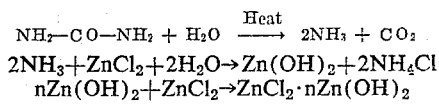
$$2NH_3 + ZnCl_2 + 2H_2O \rightarrow Zn(OH)_2 + 2NH_4Cl$$
$$nZn(OH)_2 + ZnCl_2 \rightarrow ZnCl_2 \cdot nZn(OH)_2$$

When the potentially basic material is zinc nitrite, the wood is impregnated with a cold solution of unstable zinc nitrite and zinc chloride. The impregnated wood is heated, and basic zinc chloride is precipitated in the pores of the wood. The reactions may be represented as follows:

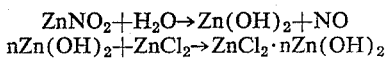

Zinc trichloroacetate works similarly if the concentration is not too high, and produces a valuable byproduct, trichloromethane (chloroform).

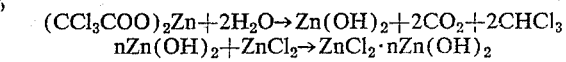

Zinc nitrite and urea together may form the potentially basic material. If wood is impregnated with a cold solution of zinc nitrite, urea and zinc chloride, the zinc nitrite and urea react, when the wood is heated, to form zinc hydroxide, and nitrogen and carbon dioxide gas. The following equation is over-simplified, because the reaction is actually more complex, but it gives a general indication of what takes place.

$NH_2CONH_2 + Zn(NO_2)_2 + ZnCl_2 \rightarrow$
$2N_2 + CO_2 + Zn(OH)_2 \cdot ZnCl_2 + H_2O$ Some $NH_3$ may be absorbed by the basic zinc chloride.

When the potentially basic material is sodium sulfite and formaldehyde, the wood is impregnated with a cold solution of these materials and zinc chloride. The reaction, upon heating of the impregnated wood may be represented as follows:

$Na_2SO_3 + CH_2O + H_2O \rightarrow HOCH_2SO_3Na +$
$NaOH(+ZnCl_2) \rightarrow Zn(OH)_2 \cdot ZnCl_2$ Similarly, when sodium thiosulfate and formaldehyde are used:

$Na_2S_2O_3 + CH_2O + H_2O \rightarrow HOCH_2S_2O_3Na +$
$NaOH(+ZnCl_2) \rightarrow Zn(OH)_2 \cdot ZnCl_2$ If potassium cyanate is used as the potentially basic material, it is desirable to maintain the impregnant water solution of KOCN and zinc chloride at a temperature of about 5° C., at which the solution is quite stable. The impregnated wood should be heated promptly to about 80° C. to precipitate basic zinc chloride. The solution decomposes at lower temperatures than 80° C., but the product then contains a considerable amount of zinc carbonate, which is not desirable. The desired reaction may be represented as follows:

$KOCN + 2H_2O \rightarrow KOH + NH_3 + CO_2(+ZnCl_2) \rightarrow$
$Zn(OH)_2 \cdot ZnCl_2(+KCl + NH_4Cl)$ As has been indicated, the solutions are not necessarily water based. For example, urea and zinc chloride can be dissolved in ethyl alcohol; and zinc chloride and ethylene oxide, propylene oxide, butylene oxide, epichlorhydrin, styrene oxide or similar epoxides can be dissolved in anhydrous isopropyl alcohol. In this case the water in wood will furnish the required water for the reaction.

The following are specific illustrative examples of the process of this invention.

*Example I*

A water solution of zinc chloride and urea, analyzing 8.5% zinc, 9.4% chlorine, 15.5% urea and the remainder water, by weight, is prepared. The molecular ratio of zinc chloride to urea is 1 to 2. Fire tube test sticks are placed in a pressure tank. A vacuum of about 22 inches gauge is applied for five to ten minutes. Sufficient of the zinc chloride-urea solution is introduced to ensure that the wood is covered, while the vacuum is maintained. An air pressure of approximately 125 p. s. i. g. is then applied to the solution for one hour. The pressure is then released and the unabsorbed solution removed from the cylinder. A vacuum of about 22 inches gauge is then applied to remove from the pores any solution which is likely to cause bleeding. The impregnation is carried out at room temperature. The test sticks are then divided into two groups, A and B. The sticks of group A are heated at 80° C. at atmospheric pressure for seven days. The sticks of group B are heated to the same temperature for nineteen days. The sticks in both groups are then leached in running water for fifteen days. The leach water used has a pH range from 9.2 to 10.5. The results are indicated in the following table:

| Group | Initial retention ZnO lbs./cu. ft. wood | Days leaching | Percent fire tube loss | |
|---|---|---|---|---|
| | | | 3 min. | ASTM final |
| A | 4.8 | 15 | 21 | 26 |
| B | 4.9 | 15 | 24 | 34 |

*Example II*

A water solution of zinc chloride and urea analyzing 7.1% zinc, 8.1% chlorine, 9.5% urea and the remainder water (a mol ratio of zinc chloride to urea of 1 to 1½) is prepared. Three groups of test sticks, A, B and C, are impregnated with the solution by the full cell procedure as in Example I. The sticks are dried for four days at about 35° C. and then heated at 80° C. for seven days. The sticks of group A are not leached at all, the sticks of group B are leached for fifteen days, and the sticks of group C are leached for thirty days. The results are shown in the following table:

| Group | Initial retention lbs. ZnO/cu. ft. wood | Percent fire tube loss | |
|---|---|---|---|
| | | 3 Min. | ASTM final |
| A | 6.2 | 10 | 12 |
| B | 6.2 | 23 | 27 |
| C | 6.0 | 25 | 31 |

Tests run under the same conditions as the test of Example II except that the test sticks are air dried from 0 to 14 days before heating at 80° C., indicate that preliminary drying is not a significant factor.

It is to be noted from Examples I and II that the use of more than a 1 to 1½ mole ratio of zinc chloride to urea, and long-continued heating of a zinc chloride-urea impregnated wood did not improve the results obtained. On the contrary, the results obtained with the use of more urea and longer heating are less desirable.

The following table illustrates the effect of long-continued heating upon wood treated with solutions containing two different molecular ratios of zinc chloride and urea. Test sticks are impregnated as in Example I. The amounts of retained zinc and chlorine were then determined. Separate groups of sticks were heated for various periods as indicated in the following table. All of the sticks were leached for fourteen days and the amounts of retained zinc and chlorine redetermined.

Molecular ratio: 1 $ZnCl_2$: 1 urea

| Percent of initial chemicals left in wood | Heating at 80° C. | | | | | | Heating at 100° C. | | | |
|---|---|---|---|---|---|---|---|---|---|---|
| | 0 days | 7 days | 14 days | 21 days | 28 days | 35 days | 0 days | 7 days | 14 days | 21 days |
| Zn | 0 | 42 | 52 | 59 | 61 | 61 | 0 | 71 | 69 | 68 |
| Cl | 0 | 14 | 19 | 24 | 21 | 15 | 0 | 6 | 6 | 6 |

Molecular ratio: 1 $ZnCl_2$: 2 urea

| Percent of initial chemicals left in wood | Heating at 80° C. | | | | Heating at 100° C. | | | |
|---|---|---|---|---|---|---|---|---|
| | 0 days | 7 days | 14 days | 21 days | 0 days | 7 days | 14 days | 21 days |
| Zn | 0 | 53 | 63 | 67 | 0 | 75 | 78 | 78 |
| Cl | 0 | 15 | 12 | 2 | 0 | 10 | 0 | 0 |

The removal of chlorine indicated by the table is though to be the result of the decomposition of an excess of urea so that more ammonia than is necessary to complete the precipitation of the basic zinc chloride is formed, which in turn reacts with the chlorine in the zinc chloride to form ammonium chloride. This then leaches out, possibly as a zinc chloride-ammonium chloride complex.

On the other hand, it is necessary to use some excess of urea over the amount theoretically necessary as calculated on the amount of zinc chloride present, because the urea apparently reacts or is in part removed from effective conversion to a base by the wood itself. Tests with minimal amounts of urea indicate that around two pounds of urea per cubic foot of wood are inactivated. This inactivation must be taken into account in the treating of wood in practice, and the amount of the excess required to produce optimum results, must be determined for the particular kind of wood to be treated.

*Example III*

A water solution of zinc chloride and potassium cyanate in the ratio of one mol zinc chloride to two mols potassium cyanate, is prepared (20% $ZnCl_2$ + 24% KOCN)

The impregnating solution is maintained at a temperature of 5° C. before and during the impregnation of the wood, but otherwise the process is carried out in the same manner as described in Example I. The test sticks of group A are subsequently heated for four days at 80° C. and atmospheric pressure, while the sticks of group B are heated for seven days under the same conditions.

A second solution, containing one mol of zinc chloride to one mol of potassium cyanate is prepared. Two groups of test sticks, C and D are impregnated in the same way as in groups A and B above. The sticks of group C are heated for four days at 80° C. and atmospheric pressure. The sticks of group D are heated for seven days under the same conditions.

The following table indicates the results obtained in each case:

| Group | Impregnation ZnO lbs./cu. ft. | Percent fire tube loss after 15 days' leaching | |
|---|---|---|---|
| | | 3 min. | ASTM final |
| A | 5.3 | 38 | 49 |
| B | 5.3 | 39 | 54 |
| C | 4.8 | 27 | 32 |
| D | 4.9 | 28 | 35 |

The test shows that the 1 to 1 molecular ratio of zinc chloride to potassium cyanate and the shorter heating period gives results far superior to the 1 to 2 molecular ratio and longer heating. The results also indicate that the potassium cyanate treatment may be carried out substantially more quickly than the urea treatment.

Such materials as potassium cyanate and the sodium nitrite-urea combination have the advantage that fixed alkalies are formed, and consequently less undesired ammonium chloride.

In those reactions in which a gas such as carbon dioxide is given off, it has been found good practice to heat the wood to low temperatures of 60° to 80° C., for example, and atmospheric pressure until the first rush of gas is given off. During that period, some of the water in the wood is evaporated, and the danger of bleeding is reduced. With less liquid in the wood, and with the rate of reaction slowed down, the temperature can be gradually raised to one at which the reaction will be completed in a reasonable length of time. The heating schedule employed will vary to a large extent with size of the piece of wood being treated. Large pieces must be heated more slowly than small ones because of the larger volume of gas to be taken care of, and because a longer time is required for the wood to be heated through.

The optimum conditions for any particular wood treatment must be determined by the results desired and the kind of wood treated. For example, if rapid treatment with a zinc chloride-urea solution having a mol ratio of 1 to 1¾ is desired, the impregnated wood may be heated to 130° C. for one hour. As has been indicated heretofore, the result will not be as satisfactory as a slower process nor, in general, is more than 1½ times as much urea as zinc chloride desired. However, the necessary excess of urea is determined in large part by the amount of urea which is "captured" by the wood, so that in some instances an even higher ratio may have to be used to obtain good results. In general, the more urea is used, the faster the process can be accomplished. If wood impregnated with a 1 to 1¾ zinc chloride-urea solution in the amount of five pounds of zinc calculated as ZnO per cubic foot of wood is heated at 60° C. for forty-two days, approximately four pounds of water-insoluble zinc oxide is formed in the wood. Extrapolation of experimental results indicates that in time the desired result can be obtained at room temperature, but the time is unduly long.

Ordinarily, it is desirable to incorporate between four and six pounds of impregnant, calculated as zinc oxide, per cubic foot of wood. The wood treated in accordance with the process of this invention has a pH of around 6, which is considered to be highly desirable, giving wood even longer life than untreated wood and making it strongly resistant to hot water and steam.

The process of this invention has been described in conjunction with the use of zinc chloride. In general, basic zinc chloride is the preferred form of the basic salt. However, sulfates in basic zinc sulfates are less soluble than chlorine in basic zinc chlorides, and sulfates may be substituted for all or part of the chloride for particular applications. Similarly, nitrates, phosphates, arsenates, and the like, can be added for specific purposes.

Sodium nitrite and other nitrites such as barium nitrite may be used as potentially basic materials. Similarly, sodium cyanate may be used in place of potassium cyanate.

As the basicity of basic zinc chloride increases, the toxicity decreases so that whereas zinc chloride in non-leaching surroundings is toxic with less than 1 lb. of ZnO per cubic foot of wood, a basic zinc chloride with a basicity of 2 to 1 ($ZnCl_2 \cdot 2Zn(OH)_2$) used for fire resistance requires around 2 lbs. ZnO equivalent per cubic foot of wood to resist termites and fungi. Accordingly, where fire resistance is not a factor and toxicity is a factor, the basicity of the compound can be lowered to around 0.2:1 or 0.5:1. For example, only 1–2 lbs. of ZnO per cubic foot of wood with a relatively larger proportion of urea may be added. In this case, we prefer to deposit basic zinc sulfate in place of basic zinc chloride, due to less corrosion in the treating solution and to nails, and due to better paintability of the treated wood and to lower solubility. Where increased toxicity is needed, a small amount of $As_2O_3$, $As_2O_5$ or other toxic materials can be added.

The process of this invention may be carried out using conventional equipment. A kiln of the type ordinarily used in the kiln drying of lumber is suitable for curing the impregnated wood, although the heating schedule may have to be modified, depending on the wood and on the chemicals with which it has been impregnated. The curing and drying of the wood can be combined in one process and the humidity can be controlled to give moisture for those reactions which require moisture, and to prevent warping of the wood. The chief source of moisture to complete these reactions can be the wood itself. Moisture from the interior of the wood migrates slowly to the exterior and thus furnishes a slow but continuous supply of water, which permits the reaction to proceed without the undue production of heat, alkalinity, and gas. This produces a dense, effective precipitate.

In drying the treated wood in the usual kiln, the wood dries more slowly than untreated wood, especially when first heated, due to the reduction in vapor pressure caused by hygroscopic salts such as zinc chloride in the wood. As the reaction progresses, the wood becomes less hygroscopic, and the process speeds up.

The wood has been heated satisfactorily under pressure. This reduces the volume of evolved gas and reduced the danger of bleeding. The heat can also be applied by means of high frequency energy, as is now done in the lamination of wood and a surface effect can be obtained with infra red radiation.

Wood treated by the process of this invention is fire-resistant, resistant to fungi and thus decay, toxic to termites and repugnant to marine borers. Even barnacles adhere to it to a lesser degree than they adhere to untreated wood, and the basic zinc chloride and sulfate imprenants are harmless to warm-blooded animals, unless some poisonous material such as an arsenic compound has been incorporated for some particular purpose.

Having thus described the invention, what is claimed and desired to be secured by Letters Patent is:

1. The process of treating wood, comprising impregnating pores of the wood with a solution of a water-soluble zinc salt and a potentially basic material which, in the condition in which it is during said initial impregnation, does not react with said zinc salt, thereafter converting said potentially basic material, in the pores of the wood, to a basic material capable of converting a part of the water soluble zinc salt to zinc hydroxide, reacting said basic material with a part of the water soluble zinc salt to form zinc hydroxide, and co-precipitating the said zinc hydroxide and water soluble zinc salt, in the form of a water-insoluble basic zinc salt, in place on the walls of the said pores.

2. The process of treating wood, comprising impregnating the pores of the wood with a solution of a water-soluble zinc salt and urea, heating the impregnated wood and supplying sufficient water to hydrolize the urea to form ammonia, reacting said ammonia with water and a part of the water soluble zinc salt to form zinc hydroxide, and co-precipitating the said zinc hydroxide and water soluble zinc salt, in the form of a water-insoluble basic zinc salt, in place on the walls of the said pores.

3. The process of treating wood, comprising impregnating pores of the wood with a solution of a water-soluble zinc salt and an alkali metal cyanate, heating the impregnated wood and supplying water to hydrolize the alkali metal cyanate to form an alkali metal hydroxide, reacting said hydroxide with a part of the water soluble zinc salt to form zinc hydroxide, and co-precipitating the said zinc hydroxide and water soluble zinc salt, in the form of a water-insoluble basic zinc salt, in place on the walls of the said pores.

4. The process of treating wood, comprising impregnating the pores of the wood with a water solution of a water soluble zinc salt and a metal nitrite, heating the impregnated wood to hydrolize the metal nitrite to form a hydroxide, reacting the hydroxide with a part of the water soluble zinc salt to form zinc hydroxide, and co-precipitating the zinc hydroxide and water soluble zinc salt, in the form of a water insoluble basic zinc salt, on the walls of the pores.

5. The process of treating wood which contains moisture, comprising impregnating the pores of the wood with an alcoholic solution of a water soluble zinc salt and a potentially basic material which, in the condition in which it is during said initial impregnation, does not react with said zinc salt and which requires water to function as a basic material capable of converting a part of the water soluble zinc salt to zinc hydroxide, utilizing the moisture in the wood to supply the water required to cause the potentially basic material to act as a basic material in the pores of the wood, reacting the basic material with a part of the water soluble zinc salt in the said water to form zinc hydroxide, and co-precipitating the zinc hydroxide and water soluble zinc salt, as a water-insoluble basic zinc salt in place on the walls of the pores of the wood.

6. The process of treating wood which contains moisture, comprising impregnating the pores of the wood with an anhydrous alcoholic solution of a zinc salt and an alkylene oxide, utilizing the moisture of the wood to hydrolize the zinc salt and render the alkylene oxide reactive with the acid hydrolysis products thereof to form zinc hydroxide, and co-precipitating the zinc hydroxide and water soluble zinc salt, in the form of a water-insoluble basic zinc salt, in place on the walls of the pores of the wood.

7. The process of claim 2 wherein the solution of the zinc salt and urea is aqueous.

8. The process of claim 2 wherein the solution of the zinc salt and urea is alcoholic and the wood being impregnated contains sufficient moisture to accomplish the hydrolysis.

9. The process of claim 2 wherein the water-soluble zinc salt is zinc chloride.

10. The process of claim 5 wherein the potentially basic material is an alkali metal cyanate.

References Cited in the file of this patent

UNITED STATES PATENTS

| | | |
|---|---|---|
| 2,097,509 | Boller | Nov. 2, 1937 |
| 2,637,691 | Pershall | May 5, 1953 |